Feb. 13, 1940.   R. L. A. VALTAT   2,189,846
AUTOMATIC RELAY CONTROL SYSTEM
Filed July 31, 1937   7 Sheets-Sheet 1

Inventor:-
Raymond Louis André Valtat
By Brown + Newark
Attorneys

Feb. 13, 1940.   R. L. A. VALTAT   2,189,846
AUTOMATIC RELAY CONTROL SYSTEM
Filed July 31, 1937   7 Sheets-Sheet 2

Inventor:-
Raymond Louis André Valtat
By Brown & Deward
Attorneys

Feb. 13, 1940.    R. L. A. VALTAT    2,189,846
AUTOMATIC RELAY CONTROL SYSTEM
Filed July 31, 1937    7 Sheets-Sheet 3

Inventor:-
Raymond Louis André Valtat
By Browne Seward
Attorneys

Patented Feb. 13, 1940

2,189,846

UNITED STATES PATENT OFFICE 2,189,846

AUTOMATIC RELAY CONTROL SYSTEM

Raymond Louis André Valtat, Saint-Mande, France, assignor to Jean Francois Augier-Queyras, Paris, France Application July 31, 1937, Serial No. 156,733
In France August 5, 1936

2 Claims. (Cl. 175—320)

The present invention relates to systems for automatically controlling a relay in response to the working of a measurement instrument including a movable member adapted to cooperate with a stationary contact for actuating said relay. The invention is more especially, although not exclusively, concerned with systems of this kind in which the measurement instrument in question is a galvanometer the needle of which is adapted, when touching a stationary contact, to operate the relay.

In systems of this kind, such as they exist at the present time, in view of the relatively low torque which produces the displacements of the needle or other movable member, the working of the relay is controlled in an unsatisfactory manner because, on the one hand, the needle cannot remain firmly applied against the stationary contact, and, on the other hand, it does not leave said contact as soon as the measurement instrument developes a torque tending to produce this displacement. Furthermore, the current for energizing the relay is necessarily low.

The object of the present invention is to provide an automatic relay control system which obviates these drawbacks.

According to an essential feature of the present invention, the action produced on the relay by the cooperation of the movable control member (needle of a galvanometer) with the stationary contact is limited to a very short time since the relay, immediately upon being energized, closes a shunt circuit which directly connects it with the source of current.

According to another feature of the invention, corresponding to the case in which said measurement instrument is electrically operated, means are provided, under the control of said relay, for sending, after the closing of the shunt circuit above mentioned, a strong current impulse through said measurement instrument in such manner as to move said control member (needle) away from said contact.

According to an embodiment of the invention, the measurement apparatus is provided with another contact located on the other side of said control member (needle of a galvanometer) with respect to the first mentioned contact so that when said control member comes to touch said second contact a circuit including both said control member and said second contact de-energizes said relay, means being also advantageously provided, in connection with said second contact and under the control of said relay, for moving the control member away from the second mentioned contact when the relay has been de-energized.

According to another embodiment of the invention, means are provided for intermittently de-energizing said relay at predetermined intervals of time, so that if, after an interruption of the action of said relay, the measurement instrument still brings the movable contact member into a position in which it cooperates with the stationary contact, the relay is again energized, until it is again cut off, and so on until the position of the control member actuated by the measurement instrument becomes such that it no longer touches said contact. The advantage of this arrangement is that the working of the relay is not prolonged unduly.

According to still another feature of the present invention, which is preferably taken in combination with the arrangement just above set forth, the measurement instrument is provided with means for varying its own sensitiveness in accordance with the amplitude of the preceding measurement.

The advantage of this arrangement is that the action of the relay which, as it results from the preceding explanations, is controlled by the measurement instrument, is made to correspond to the indications of the measurement instrument, and is more or less important according to the deviation of the movable part of said instrument. For instance, if the measurement instrument indicates the importance of differences between predetermined conditions and the actual conditions, the action of said relay may be made to correspond to the value of said differences.

Other features of the present invention will result from the following detailed description of some specific embodiments thereof.

Preferred embodiments of the present invention will be hereinafter described, with reference to the accompanying drawings, given merely by way of example, and in which.

Figure 1:
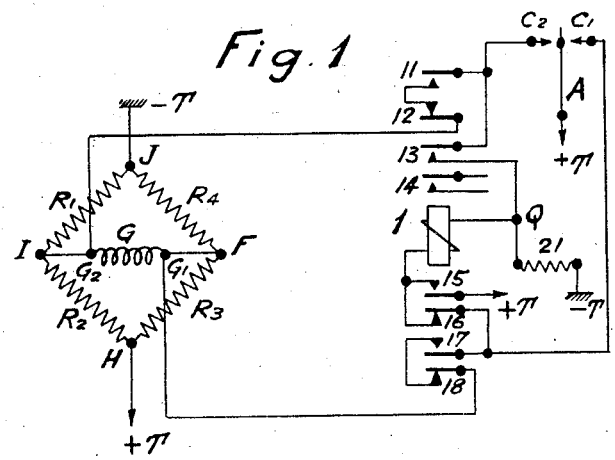
Fig. 1 is a diagrammatical view of a system according to the invention.

It will be assumed that the device of Fig. 1 is employed for controlling the temperature of a certain space and keeping it within predetermined limits. For this purpose, the resistance $R_4$ of the Wheatstone bridge $R_1$, $R_2$, $R_3$, $R_4$ (zero method) is placed, in the known manner, inside this space and varies together with the temperature thereof, which produces a current of variable intensity and direction in the diagonal IF of the bridge. In this branch IF is disposed the winding G of a galvanometer the needle A of which can move between contact abutments $C_1$ and $C_2$.

The two ends J and H of the bridge are connected with a direct current feed source T. An electromagnetic relay I, which may be of the type used in telephony, operates spring blades 11 to 18. The position of the blades disclosed by the drawings corresponds to the position of rest of the relay, that is to say to the relay being not energized. The relay, through its contact 14, controls the apparatus for heating the space in question. The pivot of the needle A and the blade 15 of the relay are connected to the + of the battery T, whose — is connected to the extremity Q of the winding of the relay through a resistance 21.

The various elements that constitute the bridge have been determined in such manner that it is balanced, or in equilibrium, when the temperature of the space in which resistance $R_4$ is located is equal to the normal temperature of adjustment of the apparatus.

The relay being in the state of rest and the whole system being fed with current, the circuit for starting the device which heats the space in question is opened at contact 14. It will be supposed that the temperature of this space is too low and that a current is flowing from $G_2$ to $G_1$ through the frame G of the galvanometer. Needle A moves toward the right.

If the temperature in the space above mentioned reaches the lower limit that is permitted, the driving torque produced by the current flowing through frame G is sufficient for bringing needle A into contact with abutment $C_1$.

The following circuit, called "sticking circuit", is then closed: positive terminal of T, needle A, fixed contact $C_1$, spring 16 of relay I, and its contact of rest, winding of relay I, resistance 21 and negative terminal of T.

Relay I attracts its armature and operates its contact springs, in the following order:

12 opens its contact of rest;
13 closes its contact of work;
15 closes its contact of work;
16 opens its contact of rest;
17 closes its contact of work;
18 opens its contact of rest.

For the contacts that are not mentioned, the time at which they operate is without influence upon this action of the relay.

Through spring 15 and its working contact connected to the positive terminal of T, relay I closes its holding circuit + T, 15, I, Q, 21 —T and through its spring 16 it opens its sticking circuit. The holding circuit being independent of needle A, the holding of the relay in the working position will not be influenced by the vibrations of said needle.

Spring 12 opens its circuit of rest before spring 13 closes its contact of work, in order to avoid the emission of a detrimental impulse in a direction such that it would prevent relay I from attracting its armature sufficiently for closing its holding circuit.

If the needle A of the galvanometer is still in contact with $C_1$ when spring 17 closes its contact of work, spring 18 having not still abandoned its contact of rest, the following circuit, called "circuit for moving away the needle" is closed during the operation of the relay: positive terminal of T connected to needle A, contact $C_1$, spring 17 and its contact of work, spring 18 and its contact of rest, end $G_1$ of the galvanometer, winding G of the galvanometer, point I of the bridge, resistance $R_1$, point J, negative terminal of T.

A current the intensity of which will be much higher than that of the current which had produced the displacement of needle A flows through the winding of frame G. This high intensity current is in a direction opposed to that which has brought the needle into contact with the abutment. It produces a torque of an important value which suddenly urges needle A toward the left hand side and moves it away from the abutment in question.

A short time after the circuit for moving away the needle has been completed, as the armature of relay I keeps moving, the spring 18 leaves its contact of rest, bringing the abutment $C_1$ out of contact.

Contact $C_1$ is thus insulated from the control circuits and if the needle again touches contact $C_1$, no operation then takes place.

Relay I closes, through its spring 14 and its contact of work, the circuit for starting the means for heating the space the temperature of which is to be controlled.

It will be noted that the intensive current impulse which causes the galvanometric relay to be moved out of contact is emitted for an extremely short time during the operation of 17 and that of 18 and which corresponds, at most, to the time of operation of relay I. It follows that the heating produced by this quick impulse of high intensity current will not be sufficient for injuring either the various spiral elements or the contacts of the galvanometric relay.

The breaking of the contact of the needle with $C_1$ might have been produced by sending a current impulse in the same direction as the current producing the displacement of the needle. It would suffice, for this purpose, to connect spring 18 of the relay with the end $G_2$ of winding G instead of connecting it to the end $G_1$.

In this case, the current impulse would have had for its effect strongly to apply the elastic structure constituted by the needle and its driving means against the stationary abutment $C_1$. When spring 18 opens its contact of rest, the elastic reaction of the movable system moves the needle away from said contact. It will be noted that, in this case, the breaking of the contact between the needle and $C_1$ takes place after the opening of the spring contact 18, so that no current flows in said needle contact, which has for its effect wholly to eliminate the spark which might otherwise be produced when this contact is broken.

The system for heating the space that is being considered having been started by the closing of the circuit of spring 14, the temperature of said space rises. The value of resistance $R_4$ varies in a direction opposed to that above considered. If, after having passed from the normay adjustment value, the temperature reaches the upper limit value that has been fixed, the current that flows through the winding of the frame G of the galvanometer is in a direction opposed to that which has produced the first displacement of needle A and said needle moves toward the left and comes to strike fixed contact $C_2$.

The following circuit, called "circuit for short-circuiting relay 1" is closed: positive terminal of T connected to needle A, contact $C_2$, spring 13 of relay 1 and its contact of work, resistance 21 and negative terminal of T.

Relay 1 releases its armature which brings back the various contact springs into the position of rest. The adjustment of the relay has been made in such manner that, during this operation, the opening and the closing of the following contacts take place in the following order:

> 15 opens its contact of work;
> 13 opens its contact of work;
> 12 closes its contact of rest;
> 11 opens its contact of work.

For the contacts that are not mentioned, the time at which they operate has no influence upon the operation of the relay.

As a consequence of the fact that contacts 12 and 11 are both closed simultaneously during a very short time, the following circuit, called "circuit for moving away the needle from its contact" is closed: positive terminal of T connected to needle A, contact $C_2$, spring 11 and its contact of work, spring 12 and its contact of rest, end $G_2$ of the winding of G, end $G_1$, point F of the bridge, resistance $R_4$, point J of the bridge, and negative terminal of T.

An intensive current impulse, in the direction opposed to that which had produced the displacement of needle A toward $C_2$ flows through G and produces a torque sufficient for moving needle A away from contact $C_2$. This impulse lasts but for a portion of a second corresponding at most to the operation of the relay. I might obtain the displacement of the needle away from the contact by the elastic reaction obtained by causing an intensive current to flow through G in the same direction as the current that has produced the operation of the needle. It would suffice, for this purpose, to connect spring 12 with $G_1$ instead of connecting it with $G_2$.

Relay 1 having come back to the position of rest opens through its armature 14 the circuit for starting the means for heating the space that is being considered.

It will be seen that, in order to obtain a correct working of the device, it is necessary that the springs of the relay should be operated in the order above indicated, as well when the needle is brought against the contact abutment as when it is moved away therefrom.

Instead of deenergizing the relay 1 by short-circuiting the winding of the relay, it is possible to obtain the same result by providing the relay with two windings one of which would be utilised for producing the attraction of the armature and the second of which would serve to release the armature of the relay, the current flowing through each of these windings being, in this case, in a direction opposed to that flowing through the other one, so that the ampere-turns compensate.

Figure 2:
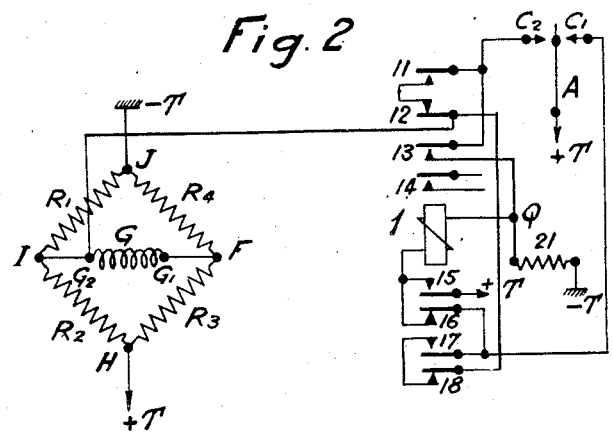
Figs. 2 and 3 are diagrammatical views of modifications.

In the diagram of Fig. 2, the movement of the needle away from the cooperating contact $C_1$ is obtained, when relay 1 is energized, by emitting through G an intensive current impulse in the same direction as the current that has been driving the needle toward the right. For this purpose, spring 18 has been connected to the end $G_2$ of G instead of being connected to the end $G_1$ as in the embodiment of Fig. 1.

Springs 12 and 18 might also be connected to $G_1$, but the actions producing movements of the needle away from the contact cooperating therewith would be reversed.

When this movement of the needle away from the contact cooperating therewith is obtained by sending into G a current impulse in a direction opposed to that of the current that has moved the needle against said contact, it may happen that a spark is produced when the contact is broken, as a consequence of the fact that this contact is under tension.

Figure 3:
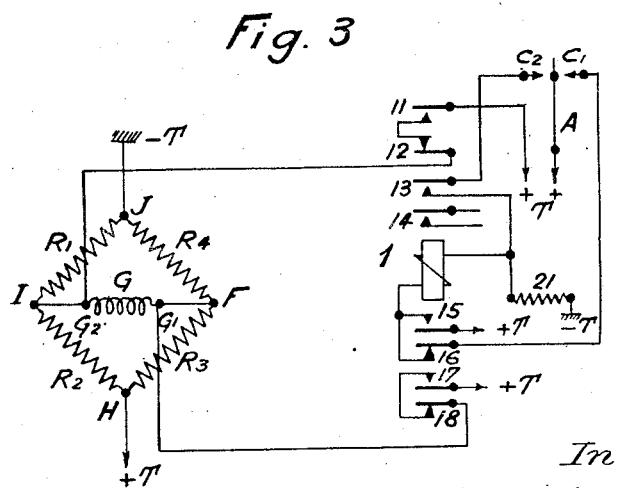

This drawback is avoided by making use of the arrangement of Fig. 3, in which springs 11 and 17 are connected directly to one of the terminals of T, the positive terminal in the case of the figure.

The operation of the Wheatstone bridge remains identical to that above described. When needle A comes against contact $C_1$, the circuit of relay 1 is closed. 15 closes its contact, 16 opens its contact of rest, 17 closes its contact, 18 opens its contact; 18 and 17 are both closed simultaneously for a short time, which completes, during this time, the following circuit for moving away the needle from its cooperating contact: positive terminal of T, spring 17, and its contact of work, spring 18 and its contact of rest, $G_1$, winding G of the frame, I, resistance $R_1$, J, and negative terminal of T.

It will be seen that, in this case, the contact between the needle and $C_1$ is not under tension when the current impulse for breaking this contact is emitted.

In a likewise manner, when the needle comes into contact with $C_2$, the contacts of the relay are brought back to the state of rest in the following order: 13, 12, 11. An impulse for moving away the needle from the cooperating contact $C_2$ is sent during the period of time between the closing of 12 and the opening, of 11, after the opening at 13, of the circuit of contact $C_2$.

It should be noted that when the relay is brought into operation, spring 11 closes its contact of work before spring 12 has left its contact of rest. Both of these contacts remain closed simultaneously for a short time and the following circuit is completed: positive terminal of T, spring 11 and its contact of work, spring 12 and its contact of rest, $G_2$, winding of G, $G_1$, F, $R_4$, J, and negative terminal of T.

The closing of this circuit produces the emission through G of a sudden impulse of current of high intensity in a direction such that it increases the pressure of the needle upon fixed contact $C_1$. This impulse is without detrimental action upon the movement of the needle away from the contact with which it cooperates provided that spring 12 opens its contact of rest before spring 17 closes its contact, so as to avoid the production of two currents in opposite directions which would annihilate their effects.

In a likewise manner, when relay 1 releases its armature, the fact that contacts 17 and 18 are both closed simultaneous for a short time produces the emission in G of a current impulse which tends to apply needle A more strongly against abutment $C_2$. This impulse will not interfere with the movement of the needle away from contact $C_2$ provided that spring 17 opens its contact before the return of spring 12 onto its contact of rest.

Figure 4:
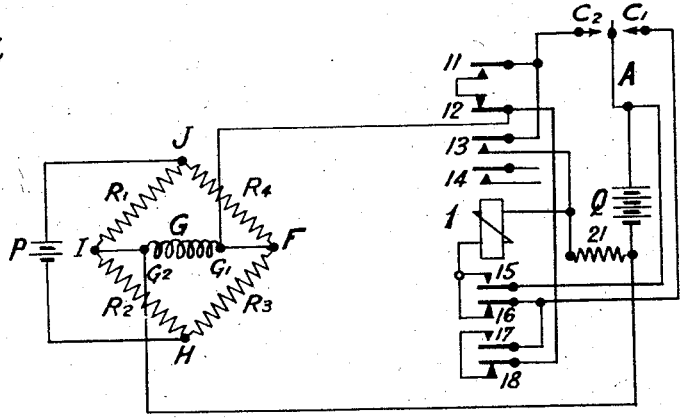
Fig. 4 is a diagram of a device similar to the preceding one, in which the relay is fed from an independent source of current.

Fig. 4 shows the diagram of a control device similar to those above described, but in which the bridge and the control relay 1 are each fed by an independent battery, the voltages of these two batteries being eventually different.

The operation of this device is anologous to that of Fig. 2, one of the terminals of battery Q (the negative terminal in the example illustrated by the drawing) being normally connected to one of the ends $G_2$ of G. The impulse for moving away the needle is sent through G when the needle has come onto $C_1$, that is to say when the relay is energized by connecting the other terminal of Q to the end $G_1$ of G through the following circuit: positive terminal of battery Q, needle A, contact $C_1$, 17 and its contact of work, 18 and its contact of rest end, $G_1$ of G. The impulse thus emitted strongly applied needle A against $C_1$. The movement of the needle away from contact $C_1$ will be produced by the elastic reaction at the end of the impulse. When A is in contact with $C_2$, its movement away from said fixed contact will be produced by a current impulse in a direction opposed to the current which has brought it against $C_2$, this impulse being sent from battery Q through springs 11 and 12, which have their contacts simultaneously closed for a short time.

It should be well understood that the invention is not limited to the embodiments which have just been described with reference to the drawings. The deviation of the needle of the measurement apparatus, for instance a galvanometer, might be controlled not only through a balanced Wheatstone bridge fed with direct current but also, through a Wheatstone bridge with a continuous deviation, through a bridge fed with alternating current, and even directly, without an intermediate bridge, for instance by feeding the frame of the galvanometer through a thermoelectric couple, a photoelectric cell, the operation remaining identical to that above described.

Such embodiments are described with reference to Figs. 5 and 6.

Figure 5:
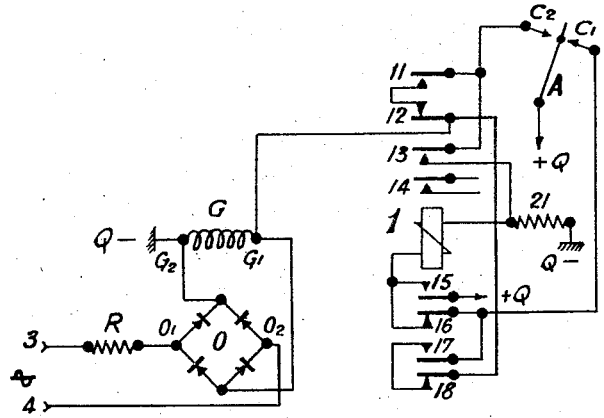
Figs. 5 and 6 show the connections of a system according to the invention as applied to the control of an alternating tension.

Fig. 5 diagrammatically shows a device according to the invention, which can be utilised for controlling an alternating tension. Terminals 3 and 4 are connected to the alternating tension to be controlled. This tension is transmitted to the terminals $O_1$ and $O_2$ of a current rectifying system O which feeds current to the winding G of the galvanometer, this direct current flows always from $G_2$ to $G_1$. A resistance R may be inserted in the alternating tension circuit, in order to bring down the current fed to galvanometer G within the limits of sensitiveness of the apparatus. Let us assume that the zero of the scale of the galvanometer is, say, at the left of both contacts $C_1$ and $C_2$ and that $C_1$ registers with the maximum allowable for the absolute value of the tension to be controlled, for example 115 volts whereas $C_2$ registers with the minimum allowable, for example 105 volts. The needle A and the contact 15 are connected to the + of a source of D. C. Q; the winding of the relay $C_1$ and the point $G_2$ to the − of the same source.

The general working of the device remains identical to that above described. The closing by spring 14 of its contact of work as a result of the closing of the contact $AC_1$ which energizes the relay 1 completes the control circuit of the device, not shown, producing the diminution of the tension that is to be controlled whereas the closing of contact $AC_2$ results in the short-circuiting of the relay. Consequently the mechanism which reduces the tension in the nest 3—4 is brought at rest.

The movement of the needle away from contact $C_1$ is obtained by direct expelling when both of the contacts 17 and 18 are simultaneously closed and the movement away from contact $C_2$ by rebounding when both of the contacts 11 and 12 are simultaneously closed of course in each of the cases the impulse of current sent in G flows from $G_1$ to $G_2$ and its action is to urge the needle in the direction $C_1$ $C_2$. Consequently the needle is thrown away from $C_1$ by direct expelling and from $C_2$ by bouncing off.

Figure 6:
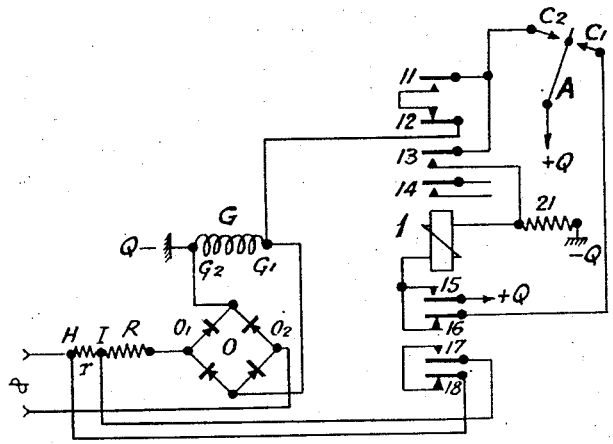

In Fig. 6, I have shown the diagram of a device for controlling an alternating tension which is analogous to the preceding one, but in which the movements of the needle away from abutments $C_1$ and $C_2$ are both obtained by rebouncing. Instead of having springs 12 and 18 directly connected to point $G_1$, spring 18 is connected to one end H of resistance R. Instead of having 16 and 17 connected to $C_1$, 17 is connected to an intermediate point, I, of resistance R.

If the tension that is controlled reaches the lower limit, as spring 14 has its contact opened, needle A comes into contact with $C_1$, which is supposed to be the contact corresponding to the maximum of voltage. Relay 1 is energized and attracts its armature. When, during the operation of said relay 1, springs 17 and 18 simultaneously close their contacts, a portion $r$ of resistance R is short-circuited. This produces a sudden increase of the current flowing through G, which corresponds to a sudden displacement of the needle toward the right, that is to say in the direction of contact $C_1$. The value of the portion of the resistance that is short-circuited is so chosen as to obtain a torque sufficient for producing by rebounding a movement of the needle away from the contact $C_1$ against which it is applied, without the corresponding amplitude of this movement being sufficient for bringing the needle into contact with $C_2$.

Spring 14 having closed its contact of work and having thus actuated the device, not shown, which produces the lowering of the tension, said tension diminishes and reaches the lower limit provided for it. Needle A then comes into contact with $C_2$, producing the release of relay 1 by short-circuiting.

During this release, springs 11 and 12 have their contacts simultaneously closed for a short time, and an impulse of continuous current in the direction which has moved the needle A toward $C_2$ produces the movement of A towards said abutment.

It should be well understood that it would be possible, with a device identical to that of Figs. 5 and 6, to control an alternating intensity. The same devices might be utilized for the control of a continuous tension or intensity, by eliminating the rectifying device O.

In the embodiments above described, the relay is de-energized by the contact of the needle of the galvanometer (or an analogous index) with a second abutment corresponding to the opposed limit value of the phenomenon which is controlled or which is to condition the control. Consequently, this phenomenon varies constantly between these two extreme limits without keeping a mean value.

Furthermore, it has been proposed to send into the galvanometer, for any movement of the armature of the relay, an impulse which produces the movement of the needle or other index away from the stationary contact with which it cooperates. But it is necessary either to limit the value of the torque producing this movement, in order to avoid too large a displacement of the needle, which would bring it into contact with the other stationary contact, thus producing disturbances, or to place these two stationary contacts at a substantial distance from each other. The first solution reduces the safety of working of the device, and the second impairs the sensitiveness of the whole system.

In the embodiments which will now be described, these drawbacks are avoided owing to the utilization of a testing device of a suitable kind, such for instance as a cam with a boss or a device controlled by a bi-metallic blade, which produces, at predetermined intervals, the setting into action of the controlling and regulating device, no current flowing, preferably, through the frame of the galvanometer between two tests taking place consecutively (so that, in this case, the needle of said galvanometer periodically comes back to zero).

Figure 7:
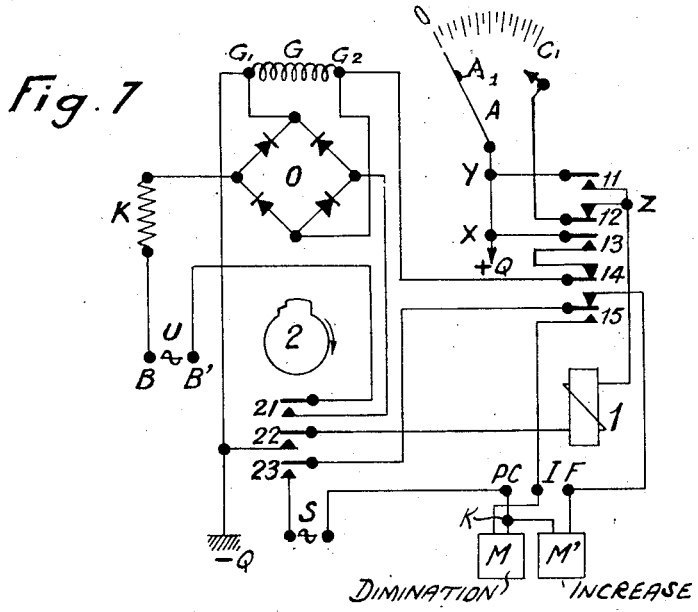
Figs. 7 and 8 are diagrams of connections of another embodiment of the system according to the invention, including means for intermittently de-energizing the relay.

It will be supposed, for facilitating the explanations, that the device shown by Fig. 7 is employed for controlling an alternating tension in the line BB'. This device includes a galvanometer having a movable frame G, of the deviation type, fitted with a needle A carrying a contact $A_1$.

The stationary contact $C_1$ is located in fixed position on the graduation of the galvanometer scale which corresponds to the desired value of the tension. The frame G of the galvanometer is fed, according to a known process, through a rectifying device O, by the tension to be controlled, which is impressed upon the terminals B, B'. A cam 2 is driven by a motor, not visible on the drawings, and it turns in a permanent manner at a predetermined and preferably uniform speed. This cam operates the contact springs 21 to 23. It will be noted that the feed circuit of needle A is independent of that which feeds current to the frame G of the galvanometer, the first named circuit being fed by a source Q of current.

To the terminals PC, I and F are connected devices M and M' which are not shown in detail, their specific structure having no bearing upon the invention. One of these devices, M, acts, when it is set into operation by current source S for producing a reduction of the tension to be controlled, and the other, M', acts to produce an increase of the tension to be controlled. These devices may be constituted, for instance, by a single engine which, for one direction of rotation, would perform the function of M, whereas, for the opposite direction of rotation, it would perform the function of M'.

When cam 2 does not operate contacts 21 to 23, the feed circuit of the rectifying device is opened by a spring 21. Under these conditions, no current is flowing through the winding G of the frame and needle A is on the zero of the scale. Spring 23 opens the feed circuit S, 23, 15, F, M', K, PC, S of device M'.

When the boss of cam 2 operates its contact springs, it connects to 21 the tension to be controlled, that is to say it connects it to the rectifying device O (testing) and a current flows in G from $G_1$ to $G_2$ moving needle A toward right hand. If the value of this tension is lower than the desired tension, needle A does not come into contact with abutment $C_1$.

Through spring 23, cam 2 completes the circuit of M'. During the whole of the time for which cam 2 displaces spring 23, the device M' acts in such manner as to increase the tension. This action ceases as soon as the boss of cam 2 releases spring 23.

Device M' will be brought into play, for every revolution of cam 2, for a predetermined time, as long as the tension to be controlled has not reached the desired value.

If the value of the tension exceeds the desired value, every time cam 2 closes, through its spring 21, the feed circuit of frame G, needle A moves a sufficiently great distance for touching abutment $C_1$. The following circuit is then closed: positive terminal of Q, needle A, contact $C_1$, spring 12 and its contact of rest, winding of relay 1, spring 22 displaced by cam 2 and its contact of work, negative terminal of Q.

Relay 1 is energized and closes through 11 and its contact of work, its holding circuit, including the positive terminal of Q, Y, 11, Z, 1, 22, and the negative terminal of Q. 12 opens its contact of rest and opens the circuit closed by needle A through the relay 1.

Spring 13 closes its contact of work a short time before 14 opens its contact of rest. The following circuit is closed, for a short time: positive terminal of Q, spring 13, its contact of work, spring 14, its contact of work, winding G, negative terminal of Q.

A current impulse of high intensity in a direction opposed to that which had produced the displacement of needle toward $C_1$ is sent through frame G. The needle is suddenly urged toward the left, which causes it to move away from contact $C_1$ and thus eliminates all the detrimental effects which may result from the flow of the current through contacts $A_1C_1$.

If the current flowing through G has a tendency to bring back A toward $C_1$ as far as $C_1$, needle A, which is not in the circuit, may return to $C_1$ without any serious disadvantage. If, on the contrary, the magnitude that is controlled is such that A should not come in contact with $C_1$ when the cam starts working, but A has remained accidentally applied against $C_1$ after the preceding test, the needle is suddenly expelled in the same manner as above described and does not return onto $C_1$. Therefore an accidental contact of A with $C_1$ will thus involve but a false move limited to the correction corresponding to the action of a single passage of cam 2.

At the same time as the contacts 13 and 14 close the spring 15 of relay 1 completes, through its contact of work, the circuit for setting into action the device M (spring 23 is moved down by the cam). During the whole time of closing of contact 23, the device produces a reduction of the tension to be controlled.

In order to increase the safety of operation, spring 23 is operated by cam 2 preferably a short time after springs 21 and 22 have been moved (this arrangement avoids the risk of the device M' being set into operation instead of device M which could happen if 23 would close before the relay 1 is energized so as to close the circuit of device M through spring 15).

The outline of the cam is such that, at the end of every testing operation, said cam releases spring 21 before springs 22 and 23. The opening of contact 21 cuts off the feed of current to the galvanometer. When spring 22 is released, relay 1 is de-energized and it sends, through the simultaneous closing of contacts 13 and 14, an impulse for producing the movement of the needle away from contact $C_1$, said impulse flowing through frame G from $G_2$ to $G_1$. It should be noted that this current impulse has merely to overcome not the welding effects due to the flow of the current but a purely mechanical adhesion corresponding to the application of the needle against the stationary contact $C_1$, since said contact has been disconnected from the circuit since the opening of contact 12 during the attraction of the armature relay 1. The feed circuit of said frame being cut off at 21, the needle, after its movement away from contact $C_1$, cannot be brought back into contact with $C_1$. When spring 23 is released, the circuit of device M or M' is opened and the whole comes back into the position of Fig. 7.

If the action of device M has not been sufficient for lowering the tension to the desired value, said device is again brought into play, according to the operation which has just been described, for the next revolution of cam 2.

I might, without departing from the principle of the invention, make use of the same device for controlling any factor, provided that said factor corresponds to the emission into the winding G of the galvanometer of currents which vary with the values of said factor.

Figure 8:
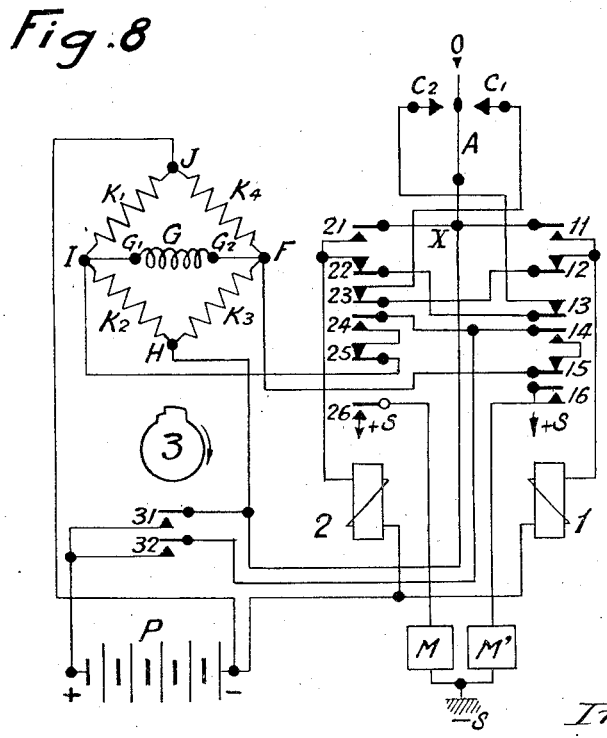

In Fig. 8, it has been assumed that the device is used for controlling in a permanent manner a temperature which is to be kept at a constant value. The resistance $K_4$ of a Wheatstone bridge of the direct current type adjusted on the principle of the zero method is placed inside the space where the temperature is to be controlled. The temperature may be acted upon, for instance, by operating a steam inlet valve. Resistances $K_1$, $K_2$ and $K_3$ are located outside of the space in which the temperature is to be controlled. The galvanometer that is utilized includes two stationary contacts $C_1$ and $C_2$ which may be disposed symmetrically with respect to the zero of the apparatus.

A cam 3 is driven at a speed, preferably uniform, imposed by a motor not visible on the drawings. It carries a boss which operates springs 31 and 32. Relay 1 can, through spring 16 and its contact of work, start the device M' which produces variations, opposed to those produced by M, of the temperature to be controlled. As for device M, it is brought into play when relay 2 is energized, its circuit being then closed. Each of these devices M and M' may consist of a servomotor adapted to operate the steam valve above referred to.

If the desired temperature in the space that is considered is to be T, needle A comes into contact with abutment $C_1$ when the temperature in said space is equal to, or lower than $T-t$ ($t$ being a function of angle $OXC_1$). It will come into contact with $C_2$ when the temperature becomes equal to or higher than $T+t'$ ($t'$ being a function of angle $OXC_2$).

First, it will be supposed that the temperature in the space that is considered is lower than or equal to $T-t$. When cam 3, under the action of its boss, displaces springs 31 and 32, it produces through spring 31 the connection of the Wheatstone bridge with battery P. The value of the current flowing through the frame G of the galvanometer say from $G_1$ to $G_2$ has a value convenient for bringing needle A into contact with $C_1$.

Spring 31 having closed its contact, the following circuit is closed: Positive terminal of the battery, spring 31 and its contact of work, needle A, abutment $C_1$, spring 23 and its contact of rest, spring 12 and its contact of rest, winding of relay 1 and negative terminal of the battery.

Relay 1 is energized and closes its holding contact 11. It opens at 12 its energizing circuit and, consequently, no current flows through needle A. Through spring 13 it produces a cut-off in the circuit for energizing relay 2, which will be hereinafter mentioned.

During the operation of relay 1, spring 14 closes its contact of work before spring 15 opens its contact of rest, in such manner that both contacts are closed simultaneously, for a short time, producing the emission into frame G of an intense current impulse from $G_2$ to $G_1$ through the following circuit: Positive terminal of battery P, spring 32, spring 14, spring 15, winding G of the galvanometer, resistance $K_1$, point J of the bridge and negative terminal of the battery. This impulse produces, if need be the movement of needle A away from its stationary contact $C_1$. It will be noted that, under the effect of this impulse, needle A can, without any disadvantage, come against contact $C_2$, since the circuit of relay 2, which might be closed by this contact $C_2$ is opened at 13 as above explained.

Finally contact 16 is closed and connects the circuit of device M' with a source of current not shown on the drawings. M' works to raise the temperature in the space that is considered said device M' working for a time which is smaller than, or at most equal to, that for which cam 3 keeps springs 31 and 32 pressed down. Cam 3 is given an outline such that it releases these springs successively so that contact 31 is first opened and then 32. The circuit of relay 1 is opened at 31 and device M' ceases to act. Relay 1, by releasing its armature, produces the simultaneous closing, for a short time, of contacts 14 and 15, and therefore, the emission, through the winding G of the galvanometer of a second impulse for moving needle A away from the contact $C_1$ with which it cooperates.

I am perfectly sure that needle A is moved away from the corresponding contact $C_1$ or $C_2$, even in the case of a highly sensitive galvanometer, because the cam profile is such that contact 32 is opened after contact 31. In this way, I am sure that the current impulse which moves the needle away from the contact on which it is applied is actually emitted when no other current is flowing through the galvanometer winding.

When spring 31 has opened its contact, it has, further, cut off the feed of current to the Wheatstone bridge. Needle A therefore comes back to the zero position, and, accordingly, it is no longer in contact with $C_1$ or with $C_2$. I thus obtain supplementary safety in the working of the device.

If the temperature modification effected by M' has not been sufficient, when, on the next turn, cam 3 presses down springs 31 and 32, the same operation as just above described is repeated and M', again brought into play, will produce a further rise of the temperature.

If, when springs 31 and 32 are depressed, the temperature ranges between the limits $T-t$ and $t'+T$, the needle is in contact neither with $C_1$ nor with $C_2$, and the steam valve, or equivalent device, will not be operated.

If, when springs 31 and 32 are depressed, the temperature of the space that is considered is equal to or higher than $T+t'$, needle A comes into contact with $C_2$ the current flowing from $G_2$ to $G_1$ in the galvanometer and the following circuit is completed: positive terminal of the battery, spring 31 and its contact of work, needle A, contact $C_2$, spring 13 and its contact of rest, spring 22 and its contact of rest, winding of relay 2, and negative terminal of the battery. Relay 2 is energized. Through its spring 21 it closes its holding circuit and through its spring 22 it opens its sticking circuit. During the operation of this relay, the simultaneous closing, for a short time, f contacts 24 and 25 produces the emission, into G, of an impulse from $G_1$ to $G_2$ through + of P, 32, 24, 25, I, G, F, resistance $K_4$, J and — of P for detaching the needle as above explained with reference to contacts 14 and 15.

Through its spring 26, relay 2 closes the circuit of device M which operates and produces a drop of the temperature in the space that is considered.

When cam 3 releases spring 31, the holding circuit of relay 2 is opened, its armature drops back and produces the simultaneous closing of contacts 24 and 25, which produces a current impulse through winding G which moves needle A away from contact $C_2$. At this time the bridge is no longer fed with current, contact 31 having been opened prior to contact 32.

The expelling of the needle by a rebounding action can be obtained by connecting spring 15 to point I of the bridge and spring 25 to point F of the same bridge.

Figure 9:
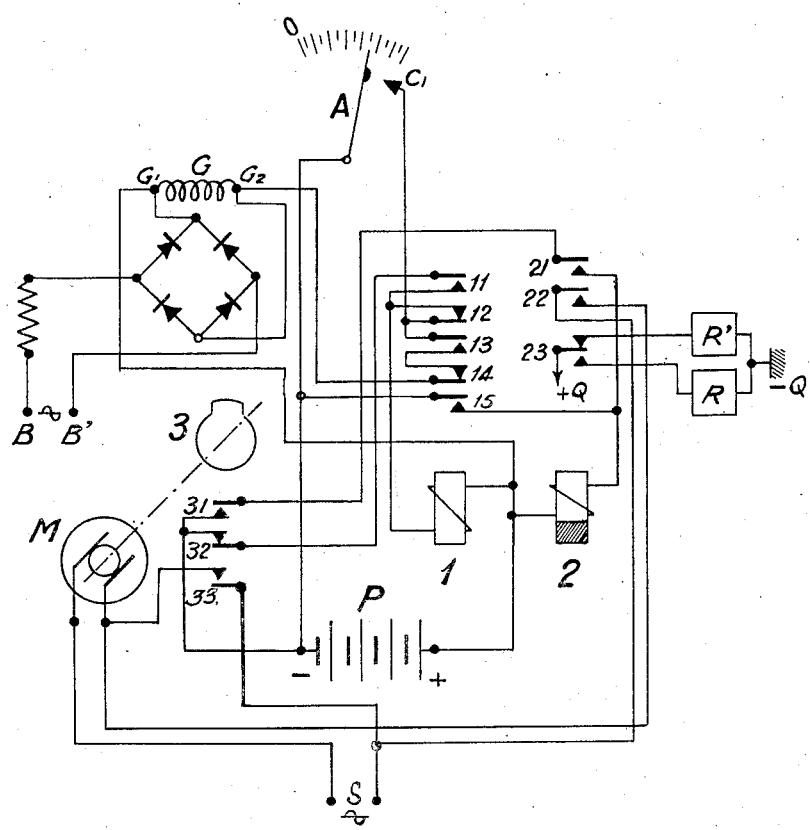
Fig. 9 is a diagram of a modification.

I will now explain the operation of the device of Fig. 9, which will be supposed, by way of example, to be utilized for the control of a tension. Cam 3 is driven by a motor M which turns only when the tension is higher than a predetermined value. The feed circuit of this motor passes through contact 22 of relay 2. The tension to be controlled is permanently connected to terminals B and B'.

If the tension that is to be controlled is lower than the desired value, needle A does not come into contact with $C_1$. Relays 1 and 2 are in the state of rest. As spring 23, which is connected with a source of current not shown on the drawings, is then applied against its contact of rest, relay 2 closes the circuit of device R', which acts for producing an increase of the tension. The circuit of motor M is opened by spring 22 and cam 3 is stationary.

When the tension reaches, or exceeds, the predetermined limit value, needle A comes into contact with $C_1$ and the following circuit is completed: negative terminal of battery P, needle A, contact $C_1$, spring 12 and its contact of rest, winding of relay 1 and positive terminal of the battery. This relay 1 is energized. Through its contact 11 it closes its holding circuit including spring 32 and the contact of rest of cam 3. At 12 it opens its sticking circuit.

During the operation of relay 1, springs 13 and 14 have their contacts closed simultaneously, for a short time, producing as above explained the emission of a current impulse in the frame G of the galvanometer, this impulse, which moves the needle away from contact $C_1$, being in a direction opposed to that of the current that has produced the displacement of the needle.

Through its contact 15, relay 1 completes in the meanwhile the circuit of relay 2, which is energized. Through contact 22, relay 2 closes the circuit of motor M, which is started, driving cam 3. Through spring 23 and its contact of work, it closes the circuit of the device which acts in such manner as to produce a reduction of the tension that is controlled. Through contact 21, it prepares its holding circuit.

Motor M rotates cam 3, which brings the springs 31 and 33 onto their respective contacts of work, spring 31 abandoning its contact of rest a short time subsequently. The holding circuit of relay 2 is closed through 31. When cam 3 produces, through its boss, the displacement of spring 32, the holding circuit of relay 1 is opened at 32. This relay is de-energized and produces, during its operation, the emission into G, during the simultaneous closing of contacts 13 and 14, of a second current impulse which moves needle A away from $C_1$ in the case of needle A being still in contact therewith. The sticking circuit of 2 opens at 15, since 1 ceases to be energized, which does not stop the working of 2, since its holding circuit is closed.

Relay 2 remains energized and device R is still operated. When the boss of cam 3 releases springs 31 and 32, 32 is closed before 31 is opened. If needle A is still in contact with $C_1$, the circuit of 1 is again closed at 32. Relay 2, in this case is not de-energized, since relay 1 again closes the sticking circuit of 2 through contact 15, before the opening of the holding circuit of 2, at 31.

In order to increase the safety of operation, relay 2 may be arranged to be de-energized with a certain delay, which permits of reducing the interval between the closing of contact 31 and the opening of contact 32. I might also control springs 31 and 32 through two different bosses, the boss adapted to control 32 being smaller than that controlling 31 and 33, so as to obtain any desired interval of time between the actions of the two bosses upon springs 31 and 33.

As long as the tension to be controlled is higher than the fixed limit, relay 2 remains in the energized position, and device R acts upon said tension so as to reduce it. When the tension becomes lower than the predetermined limit, the circuit of relay 1, opened by needle A, is no longer closed once cam 3 has released springs 31 and 32. Relay 2, the circuit of which opens at 15, will be de-energized, producing the displacement of 23, and, consequently, the setting into action of device R', which increases the tension, and the stopping of motor M, which serves to drive cam 3.

Spring 33 and its contact of work double the contact established by spring 21 and its contact of work. When the tension becomes lower than the predetermined tension, and needle A is no longer in contact with $C_1$ for again energizing relay 1, the latter comes back to the position of rest, opening, through its spring 15, the circuit of relay 2, the contact 22 of which opens, thus breaking the circuit of motor M, and stopping its rotation. The same would happen in case of accidental stopping of the feed current of M supplied by source S, when the bosses of the cam are in action.

It is clear that devices R and R' might consist of a single apparatus capable of modifying in both directions the value of the tension to be controlled.

If the phenomenon to be regulated has a tendency to vary in a single direction when it is left to itself (for instance the temperature of a very hot space which always varies in the direction corresponding to a reduction of said temperature) it is possible to eliminate device R, device R' acting always in the direction that opposes the spontaneous variation of the phenomenon. This arrangement would be, for instance, especially adapted to the control and the adjustment, by means of a Wheatstone bridge, of an oven heated through a hit and miss device, heating taking place in a continuous manner as long as the temperature of said oven is lower than the desired temperature. The heating would be stopped when the temperature of the oven exceeds the desired temperature. By choosing a sufficiently high frequency for the regulating impulses, account being taken of the inertia of the space to be controlled, this method permits of obtaining a very sensitive regulation, the interval between the temperature for which heating takes place and that at which said heating is stopped being, if need be, very small, since this interval depends merely upon the sensitiveness of the galvanometer, which may be as high as it is desired.

Figure 10:
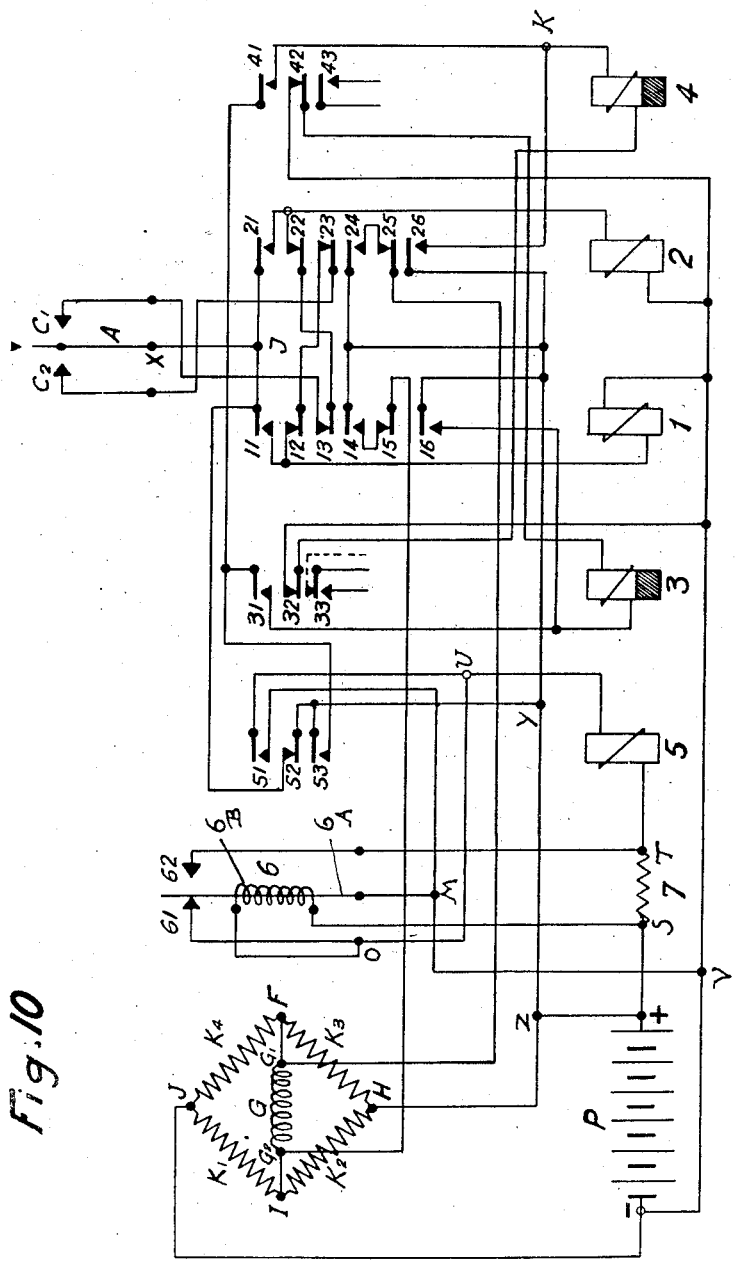
Fig. 10 is a modification in which the means for intermittently de-energizing the relay consists of a thermic element combined with an electro-magnetic relay.

The diagram of Fig. 10 shows a device similar to that of Fig. 8, but further including means for obtaining a continuous working of the regulating systems. In this embodiment of the invention, the cam driven by a motor has been replaced, for testing, by a thermic relay working in combination with an electro-magnetic relay. The thermic relay consists of a bi-metallic blade 6a moving between two contacts 61 and 62 and surrounded, in the known manner, by a heating winding 6b mounted in shunt.

The working of the thermic relay 6 and of the relay 5 is the following:

When starting, the following circuit of relay 5 is completed: positive terminal of battery P, resistance 7, winding of 5, point U, contact 61 and bi-metallic blade 6a, and negative terminal of the battery. Relay 5 is energized and, through its contact 51, it closes, on the one hand, the circuit of the heating winding 6b of the thermic relay, and, on the other hand, the holding circuit. The holding circuit of 5 includes: the positive terminal of battery P, 7, 5, U, 51, M, V, and the negative terminal of battery P. The heating circuit of 6b includes: the positive terminal of battery P, S, 6b, O, U, 51, M, V, and the negative terminal of P. Under the action of heat, the bi-metallic blade abandons contact 61, relay 5 remaining energized. When the bi-metallic blade comes into contact with 62, it produces the short-circuiting of the winding of relay 5, which is de-energized. (The short-circuiting circuit includes the positive terminal of P, 62, 6a, M, V, and the negative terminal of P and the value of resistance 7 is sufficiently low as compared with that of relay 5 for causing said short-circuiting to de-energize relay 5.

During the interval of time corresponding to the displacement, under the action of the heat, of the bi-metallic blade from contact 61 to contact 62, the needle A of the galvanometer is not connected to the battery, since contact 52 is opened. On the contrary, when relay 5 is in the position of rest (that is to say when it is short-circuited by contact 62 and during the time corresponding to the cooling of the bi-metallic blade until said bi-metallic blade comes into contact with 61) needle A is connected with the battery through 52, Y and Z.

It will be assumed, by way of example, that the device of Fig. 10 is employed for controlling the temperature in a space by means of a Wheatstone bridge one of the resistance of which, to wit K4, is variable as a function of the temperature, being located inside said space.

If the temperature in said space is lower than, or equal to, $T-t$, $t$ being a function of the angle $OXC_1$, needle A comes into contact with $C_1$. If relay 5 is, at this time, in position of rest, the following circuit is closed: Positive terminal of the battery, Z, Y, 52, J, needle A, $C_1$, 13, 22, winding of 5 relay 2 and negative terminal of the battery. Relay 2 is energized and attracts its armature. At 21 it closes its holding circuit. At 22 it opens its sticking circuit through needle A. Through 24 and 25, which are simultaneously closed for a short period of time, it produces the emission into the frame G of the galvanometer, of a detaching impulse of intensive value. This impulse is in a direction opposed to that of the current which has just displaced the needle. At 23 it cuts off the circuit of relay 1.

At 26, relay 2 closes the circuit of relay 4, which includes the positive terminal, Z, Y, 26, K, 4, 32, F, and the negative terminal, so that said relay 4 is energized. Through its contact 41, relay 4 prepares its holding circuit, which includes: the positive terminal of the source of current, Z, Y, 53, 41, 4, 32, F and the negative terminal. At 42 it cuts off the circuit of relay 3, which will be indicated hereinafter. At 43 it closes a circuit which intensifies the heating of the space that is considered.

When the bi-metallic blade comes into contact with 61, relay 5 is energized. At 53 it closes the holding circuit of relay 4, which includes the positive terminal, Z, Y, 53, 41, 4, 32, F, and the negative terminal, before opening the sticking and holding circuits of relay 2 above indicated.

Relay 2 drops back, but relay 4 is kept energized and, consequently, the electric circuit of the system producing a rise of the temperature remains closed at 43.

When the bimetallic blade, under the action of heat, comes to strike contact 62, relay 5, which is short-circuited, is de-energized and it closes its contact 52 before opening its contact 53. In this way, if needle A is still in contact with $C_1$, relay 2 is energized and again completes the sticking circuit of 4 before its holding circuit is cut off, so that 4 remains energized. In order further to increase the safety, relay 4 is of the delayed de-energizing type.

It is clear that relay 4 is kept energized as long as the temperature of the space that is to be controlled is lower than, or equal to, the minimum temperature $T-t$.

If the temperature of said space becomes higher than $T-t$, needle A leaves $C_1$ and when the relay 5 is de-energized, the circuit of relay 2 is opened at 52 so that said relay is no longer energized. A short time after the opening of relay 53, relay 4 is in turn de-energized, producing the opening of 43 and therefore stopping the heating action.

It will be noted that, every time relay 2 attracts or releases its armature, a current impulse for moving needle A away from its abutment is sent to frame G through 24, 25.

When the temperature of the space to be controlled becomes equal to, or higher than, the maximum limit of temperature, to wit $T-t'$, needle A comes against contact $C_2$. In the same manner as above described for relays 2 and 4, relays 1 and 3 are actuated. Relay 3 closes, at 33, a circuit which produces the lowering of the temperature in the space in question, this relay remaining energized as long as the needle remains in contact with $C_2$.

This device permits of obtaining multiple arrangements of control systems, and especially temperature controlling systems. In the case, for instance, of a central heating plant including two burners, it is possible, for temperatures lower than T—t, to have both burners in operation. For temperatures ranging between T—t and T+t', I may have a single burner in action, whereas, for temperatures higher than T+t' both burners are stopped.

In order to obtain this result, I connect for instance the control of one burner to the contact 43 of relay 4 and that of the other burner to a contact of rest (shown in dotted lines) of the spring 33 of relay 3. When relay 4 is energized, 3 being at rest, both burners are brought into play; when relays 3 and 4 are at rest a single burner is in action. When relay 3 is energized, 4 being at rest, both burners are out.

In the embodiments which have been described, at each test the operation of the active element is determined in the same manner (that is to say with the same intensity and even during the same time) whatever be the interval existing between the desired value of the factor that is controlled and its actual value when the test takes place, as long as said interval is greater than a predetermined value.

Such devices have drawbacks because they do not permit of varying the action of the active element. For instance, if it is desired to correct a magnitude, the value of the correction may be too great or insufficient, so that there is a risk of obtaining a difference in the direction opposed to that to be corrected, or, on the contrary, too slow a correction. In other cases, the action of the active element must be different according as between two successive tests the magnitude in question has varied or not. For instance, in the case of a fire alarm apparatus, if the temperature of a room has slightly increased, a first test gives a warning indication, and only the next test will give the indication of danger, provided that the temperature has still increased between these tests.

In the embodiments which will now be described, this drawback has been obviated by providing series of tests taking place in succession, with or without interruptions, but each of these tests modifies the adjustment of the controlling or correcting member, that is to say the minimum difference between the predetermined value and the true value of the magnitude for which the next test brings into play the controlling or correcting member. If, for instance, the first test determines a correction in the desired direction or any action whatever, when the difference between the value that is measured and the desired value is equal to, or higher than, $a$, the second test will act only if this difference is for instance equal to, or higher than, $2a$, the third will act if this value is for instance equal to, or higher than, $3a$, and so on. In this way, supposing that it is necessary to effect a correction, the correcting device will be set in motion, for instance during a unit of time, if the value of the correction to be effected is at least $a$, during for instance two units of time if the value of the correction or of the interval is at least $2a$, during for instance three units of time if this value is at least $3a$, and so on.

According to the present invention, this result is obtained, for instance, by the fact that the measurement or detection apparatus sets into action, on the one hand the correcting device and, on the other hand, a device which reduces the sensitiveness of the measurement apparatus, the interval between the value that is measured and the desired or predetermined value, or which increases the deviation of this apparatus that is necessary for causing it to act on the correcting or controlling device.

Figure 11:
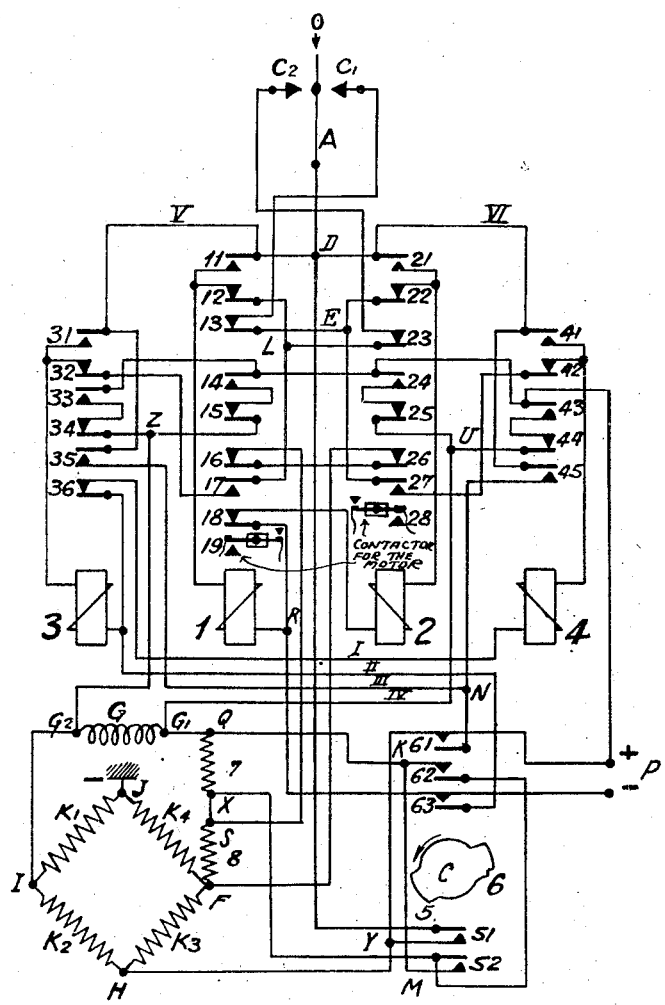
Figs. 11 and 12 are the wiring diagrams of a system according to the invention in which the sensitiveness of the measurement instrument is modified for each contact closing for a series of closings.

I will first explain the operation of the device of Fig. 11, which will be supposed, by way of example, to be applied to the control and regulation of the temperature of a space.

Resistance K4, disposed in said space, constitutes one of the branches of a Wheatstone bridge fed with direct current. The temperature of said space can be modified by acting upon a valve, not shown in the drawings, operated by an electric motor in the circuit of which are inserted contactors 28 and 19, which, when closed, determine the rotation of the motor in opposed senses. This device includes an apparatus consisting of a galvanometer having a movable frame G acting upon a needle A which can move between two stationary abutments $C_1$ and $C_2$. A cam C, turning at a speed which is preferably uniform, includes two bosses 5 and 6. Boss 5 operates springs 51 and 52 and boss 6 springs 61 to 63. The arrangement of the bosses and the direction of rotation have been chosen in such manner that boss 5 is the first to operate its springs and boss 6 starts actuating its springs a short time before 5 has released its springs. In this way, springs 51, 52, 61, 62 and 63 are simultaneously applied against their respective contacts of work.

A first resistance 7, of a value relatively important with respect to the resistance of the frame G of the galvanometer, is inserted in series in the circuit of said frame, when bosses 5 and 6 do not operate their springs. This resistance serves to reduce to a considerable degree the amplitude of the deviations of the needle of the galvanometer and, consequently, to produce, even when a current is flowing through the frame, the return to a position close to the zero of said needle.

It will be supposed that the temperature that is chosen has a value T. The value of resistance K4 will be chosen in such manner that, when it is subjected to temperature T, the Wheatstone bridge is electrically balanced. In this case, no current is flowing through frame G.

It will be supposed that the temperature of the space to be controlled is lower than said temperature T.

The value of resistance K4 decreases, producing an unbalancing of the bridge. Points I and F are brought to a certain potential with respect to each other. A current flows through frame G from $G_2$ to $G_1$, which displaces needle A, toward the right for instance. When the temperature of the space in question has reached a value T—t determined in advance, needle A comes into contact with contact $C_1$, and the next time cam 5 closes contact 52, it short-circuits resistance 7. Spring 51 closes through its contact of work the following circuit which corresponds to the energizing of relay 2: positive terminal of the battery P, Y, spring 51, contact of work, D, needle A abutment $C_1$, spring 13, contact of work, E, spring 22, contact of work, winding of relay 2, spring 18, contact of rest, R, negative terminal.

Relay 2 is energized and attracts its armature. Through its spring 21, it closes its holding circuit, which includes, the positive terminal, Y, 51, D, spring 21, relay 2, 18, R, and the negative terminal, before the opening of its sticking circuit. Through its spring 22, it opens its sticking circuit; through opening of its spring 23 it brings contact $C_2$ out of circuit in such manner that, when needle A is expelled, it can, without any drawback, come against said contact C₂. During the operation of the relay, and after the opening of contact 22, contacts 24 and 25 are closed, simultaneously, for a short time. A needle expelling impulse, in a direction opposed to that of the current which has moved the needle, is sent into frame G across the following circuit: positive terminal, spring 24, spring 25, U, wire IV, G₁, winding G, G₂, I, K₁, j, negative terminal.

Through the contact of work of its spring 28, relay 2 closes the circuit for starting the motor in the suitable direction for producing an increase of the temperature of the space to be controlled.

Spring 26 opens its contact of rest, producing the bringing into play of the second resistance 8, inserted in series in the circuit of the frame of galvanometer G. Resistance 8 is normally short-circuited when the relays are at rest, through the following circuit: S, contact of rest of spring 16, contact of rest of spring F, resistance 8. The value of resistance 8 has been chosen such as to produce a certain reduction of the sensitiveness of the galvanometer, by reducing the value of the current flowing through the frame. For instance, the insertion of this resistance reduces by one half the amplitude of the deviations of the needle of the galvanometer. Consequently, needle A will again back into contact with C₁ only when the temperature of the space to be controlled is equal to or lower than T—2t.

As cam C further rotates, boss 6 acts upon contact springs 61 to 63 before boss 5 releases springs 51 and 52. If needle A is still in engagement with C₁, that is to say if the temperature of the space is lower than, or equal to T—2t, the sticking circuit of relay 4 is completed as follows: positive terminal of the source of current, Y, contact of work of spring 51, D, A, C, contact of rest of spring 13, E, spring 27, contact of rest of spring 42, winding of relay 4, wire I, contact of rest of spring 36, wire II, contact of work of spring 63, negative terminal of the source.

Relay 4 is energized and attracts its armature. Through the contact of work of its spring 41, it closes its holding circuit, which includes, the positive terminal of the source of current, Y, 51, D, wire VI, the contact of work of spring 41, wire I, 36, wire II, 63, the negative terminal of the source, before spring 42 opens its sticking circuit. During its operation, contacts 43 and 44 are simultaneously closed and, for a short time, a needle expelling impulse is sent into frame G through the following circuit: positive terminal of the source of current, contact of work of spring 43, contact of rest of spring 44, U, wire VI, G₁, G₂, I, K₁, J, negative terminal of the source.

When boss 5 releases springs 51 and 52, the following circuit: positive terminal, contact of work of spring 61, contact of work of spring 45, contact of work of spring 41, winding 4, wire I, contact 36, wire II, 63, negative terminal, again ensures the holding of relay 4, whereas the following circuit: positive terminal, 61, N, 45, wire VI, 21, winding 2, 18, R, negative terminal, ensures the holding of relay 2.

It will be seen that, under these conditions, relay 2 is still energized, the circuit of the motor controlling the valve is still closed by spring 28, and thus the correction started during the passage of boss 5 is continued during the passage of boss 6.

At the end of the test, cam 6 releases its springs. Spring 61 opens the holding circuits of relays 2 and 4, which comes back to the state of rest. During the displacement of the armature of said relays, the simultaneous closing for a short time of contacts 24—25 and 43—44, arranged in parallel, produces the emission into G of an impulse intended to move needle A away from the abutment cooperating therewith.

Contact 62, mounted in shunt with 52 and which, by being opened, had kept resistance 7 short-circuited, brings back the latter into series connection with frame G. Needle A does not come back onto C₁ after it has been driven away; it remains substantially upon the zero.

If needle A had not been in contact with C₁ when boss 6 has operated its contact springs, the circuit of relay 4 would not have been completed and relay 2 would have come back to rest when cam 5 released its springs. In this case, the simultaneous closing of contact 24 and 25 would send into G the needle detaching impulse.

It will be noted that, at the end of a complete cycle of the various controlling and adjusting operations, all the elements of the device are brought back to their initial state and in particular, the sensitiveness of the measurement apparatus (galvanometer) has been restored to its initial value so that, under these conditions, the same intervals of temperature, with respect to the desired temperature T, will give, at the beginning of each cycle of test, the same deviations of the needle of the galvanometer.

On the other hand, if the temperature of the space to be controlled is higher than a given minimum T—2t in the example that is considered, when boss 6 starts operating its springs, needle A will no longer be in engagement with C₁, and the motor controlling the regulating valve will stop, relay 2 coming back to rest, as above explained.

If it be supposed that needle A comes into contact with C₂ when the temperature of the space is equal to, or higher than, a predetermined temperature T+t', the correcting system will not be brought into play if the temperature of the space remains between T—t and T+t' at the time of a test.

I will now explain the operation of the device when the temperature of the space becomes equal to or higher than T+t'. When cam 5 actuates its springs, resistance 7 is short-circuited by 52 and needle A comes against C₂. The following circuit is closed: (sticking circuit of relay 1): positive terminal, Y, 51, D, A, C₂, contact of rest of spring 23, L, contact of rest of spring 12, winding of relay 1, R, negative terminal. The armature of relay 1 is attracted, and the holding circuit, which includes the positive terminal, Y, 51, D, the contact of work of spring 11 1, R, and the negative terminal, is closed before the sticking circuit for expelling the needle A is opened at 12.

The simultaneous closing of contacts 14 and 15 closes the following circuit:

Positive terminal, contact of work of spring 14, spring 15, Z, G₂ G₁, Q, K, 52, X, S, resistance 8, F, K₄, J. Resistance 7 has been previously short-circuited. Resistance 8, which is the only one to be in series with G as a consequence of the opening of contact 16, can have but little influence upon the importance of the needle detaching torque produced by the passage of the current.

It is possible wholly to eliminate resistance 8 by opening contact 16 only, after the simultaneous closing of 14 and 15.

The detaching impulse is sent, after the opening of the sticking circuit of relay 2 at 13. The abutment $C_1$ is thus out of the circuit and an accidental contact of A with $C_1$ would not produce any perturbance. At the end of its movement the armature of 1 closes the contactor 19, feeding a motor not shown with a current of such direction that a valve is acted upon in the sense of the diminution of the heating.

The opening of contact 16, which places resistance 8 in series with G changes the law of regulation. Let us suppose that if the temperature of the space is higher than $T+2t'$, when boss 6 operates its springs, the needle comes back to bear upon $C_2$.

The following sticking circuit of relay 3 is completed: Positive terminal, contact 51, D, A, $C_2$, contact of rest of spring 23, L, contact of work of spring 17, contact of rest of spring 32, winding of relay 3, wire II, contact of work of spring 63, and negative terminal.

The armature of relay 3, which comes into energizing position, closes its holding circuit, which comprises the following parts: Positive terminal, contact 51, D, wire V, contact of work of spring 31, winding 3, wire II, contact 63, negative terminal, before the sticking circuit is opened at 32.

When boss 5 leaves its springs, relay 3 is kept energized by the following circuit: Positive terminal, contact 61, N, wire III, contact of work of spring 35, contact 31, winding 3, wire II, contact 63 and negative terminal, relay 1 being kept energized by the following circuit: Positive terminal, contact 61, N, wire III, contact 35, wire V, contact 11, winding 1, R, negative terminal.

During the operation of relay 3, contacts 33 and 34, arranged in shunt with 14 and 15, are closed simultaneously, a relatively intensive current flows through the following circuit: positive terminal, spring 33, contact of work thereof, contact of rest of spring 34, Z, $G_2$, $G_1$, Q, K, 52, X, S, F, $K_4$, J, negative terminal, and a needle expelling impulse is thus created. The correcting system will therefore act for the whole time of the complete test cycle. When cam 6 releases its springs, resistance 7 is short-circuited, the holding circuit of relays 1 and 3 is opened and a needle expelling impulse is sent twice through G when said relays are de-energized by the simultaneous closing first of 33 and 34 and then of 14 and 15.

When the temperature of the space is lower than $T+2t'$, when boss 6 comes into action, needle A is no longer in contact with $C_2$. Relay 1 is de-energized when boss 5 releases its springs. The correction is effected only during the time for which said boss has actuated its springs.

The contacts of rest 18 and 36 which are inserted in the circuit of relays 2 and 4 prevent the simultaneous sticking of relays 1 and 2 or 3 and 4, which might occur accidentally.

Spring 63 prevents (when, at the beginning of a test cycle, the temperature is higher than $T+2t'$ or lower than $T-2t$) relays 3 and 4 from coming immediately into energized position after relays 1 and 2 have attracted their armatures i. e., as soon as the boss 5 closes its contacts. These two relays 3 and 4 must preferably come into energized position when the temperature of the space is higher than $T+2t'$ or lower than $T-2t'$, but only when boss 6 comes into action, i. e., few moments after the beginning of the action of boss 5. As a matter of fact, it may happen that the correction produced by the action of boss 5 is sufficient for producing the necessary regulation.

In the example which has just been described, I have provided only one cam with two bosses and a cycle of test including only two tests. Of course the device according to the present invention extends to a cycle of test including as many successive tests as it is desired. For this purpose I would employ a cam with multiple bosses or several cams the respective operations of which would take place in succession, or again similar systems, each of the systematic tests producing a variation of the sensitiveness for the next test.

Instead of a single resistance modifying the law of regulation in a symmetrical manner, this resistance being brought into play by the opening either of contact 16 or of contact 26, which are connected in series, I might provide two distinct resistances, the first depending upon contact 16, the second upon contact 26. These resistances may be of equal values or of different values.

Figure 12:
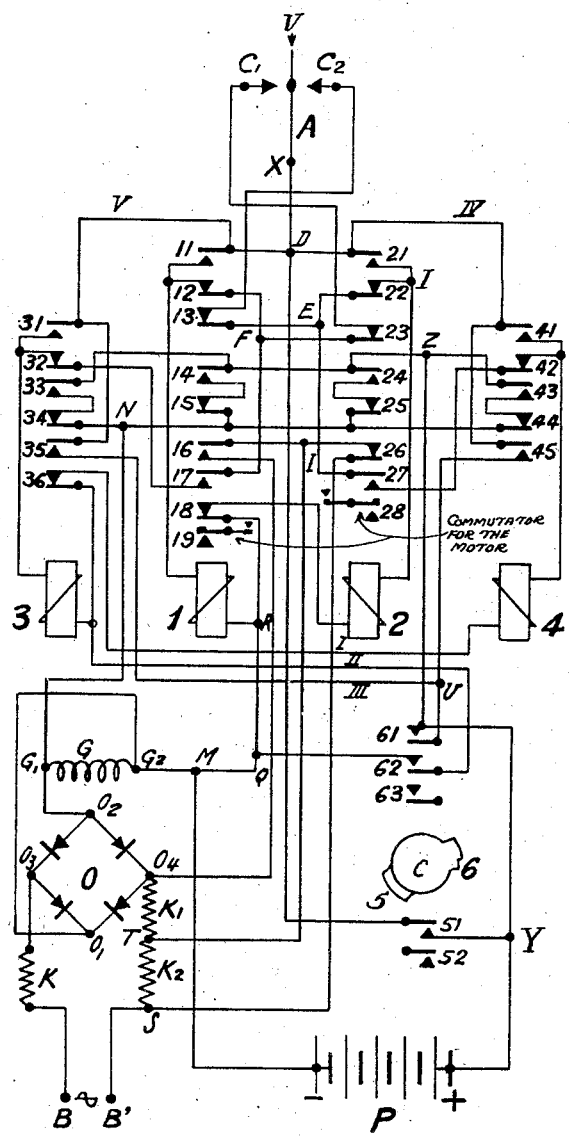

In Fig. 12, I have shown an embodiment of the invention including a galvanometer of the deviation type, utilized, for instance, for obtaining the regulation of an alternating tension.

The regulating system is set in motion when either of contacts 19 and 28 is closed; the regulating effect that is produced is however reversed for these contacts, the closing of 19 producing, for instance the increase of the tension, and the closing of 28 producing a reduction of said tension. When both contacts are opened, the adjustment or regulation system does not act.

The alternating tension to be controlled is connected to the terminals B and B'. The galvanometer that is employed being not a zero galvanometer, two resistances $K_1$ and $K_2$ are employed for modifying the sensitiveness and it is assumed that the current flows from $G_2$ to $G_1$.

The normal sensitiveness of the galvanometer has been established in such manner as to be obtained when resistance $K_1$ is in series with the circuit of the frame. Resistance K is a resistance permanently inserted in the circuit for bringing back the intensity of the controlled current within the limits of sensitiveness of the galvanometer.

The general operation of the device is identical to that set forth with reference to the preceding embodiment.

If the tension that is measured corresponds to the desired tension V, needle A is in the position shown by the drawings, and relays 1 to 4 are in the position of rest (not energized). The action of bosses 5 and 6 upon their springs produces no effect.

If the tension that is controlled is lower than a predetermined value $V-v$, when cam 5 actuates its springs the sticking circuit of relay 2 is thus completed: positive terminal, Y, contact of work of spring 51, D, needle A, contact $C_1$, contact of rest of spring 23, contact of rest of spring 12, winding of relay 1, R, Q, M, negative terminal. Relay 1 is energized and attracts its armature. It closes its holding circuit, which includes: the positive terminal, Y, contact 51, D, the contact of work of spring 11, relay 1, R, Q, M, and the negative terminal, before opening through its spring 12 its sticking circuit.

The opening of spring 13 breaks the sticking circuit of relay 2, contact $C_2$ being brought out of circuit.

During the operation of relay 1, contacts 14 and 15 are simultaneously closed for a short time, which produces the emission of a needle expelling impulse through frame G from $G_1$ to $G_2$ through the following circuit: +P, Y, W, Z, 14, 15, N, $G_1$, $G_2$, M, —P.

Through the contact of work of its spring 16, relay 1 short-circuits resistance $K_1$. The intensity of the current flowing through the frame of the galvanometer is thus increased and the needle has a tendency to leave $C_1$ for moving toward $C_2$, since the angle made by the needle with the zero graduation increases for a given tension.

Thus, the needle will remain in contact with $C_1$ only if the tension that is controlled is lower than value $V-v$ by a quantity $v'$ which depends upon the value of resistance $K_1$.

When boss 6 acts, if the controlled tension is equal to, or lower than $V-v-v'$, needle A is still in contact with $C_1$ and the sticking circuit is thus completed: Positive terminal, Y, contact 51, D, needle A, abutment $C_1$, contact of rest of spring 23, contact of work of spring 17, contact of rest of spring 32, winding 3, wire II, contact of work of spring 62, Q, M, negative terminal.

When boss 5 releases its springs, the holding circuit of relays 1 and 3 remains closed by contact 61 actuated by boss 6. The tension regulating system acts for the whole time of the cycle of test, that is to say until boss 6 releases its springs.

If the tension to be controlled had been higher than $V-v-v'$, needle A would not have been in contact with $C_1$ at the time of boss 6 starting its action. Relay 3 would not have come into energized position. 1 would have been de-energized, and the regulating system would have acted only during the time of action of boss 5.

It follows that if the tension is between values $V-v$ and $V+v_1$ ($v_1$ being a function of angle $V \times C_2$ and of the amplitude of the displacements of the needle for a predetermined tension) none of the relays of the control device will be energized and the regulating system will remain in the zero position.

If the tension is higher than or equal to $V+v_1$ at the time of boss 5 entering into play, relay 2 becomes energized. Through the opening of its contact 26, it brings resistance $K_2$ into the circuit and consequently the current flowing through G is reduced and for a reason opposed to that above indicated (increase of the sensitiveness) needle A has a tendency to move toward the left. It will come back into contact with $C_2$ only if the tension that is controlled is higher than $V+v_1+v'_1$ $v'_1$ being a function of the value of resistance $K_2$.

The sequence of the operations, in the various cases, will be identical to that indicated for the operation of relays 1 and 3.

In the examples above described, it has been assumed that one acted upon the sensitiveness of the control, by acting upon the intensity of the current flowing through the frame of the galvanometer, for the same value of the variable factor controlled or exerting a control action. The amplitude of the displacement of the frame, and, therefore of the needle, increased or diminished according, for instance, as a resistance was inserted in series into a circuit or eliminated.

It is perfectly obvious that I might, without departing from the principle of the invention, obtain the same result by shunting the frame of the galvanometer by a system of resistance connected in parallel with the frame of the galvanometer, or by acting upon the feed tension of the deviation apparatus.

I might also, without departing from the principle of the invention, increase or reduce the sensitiveness of control by acting in the course of a cycle of tests upon the position of the contract-abutments which would be displaced in the suitable direction, said abutments being brought back into their initial position at the beginning of the next test cycle.

It should be well understood that the examples above given are merely some possible embodiments of the present invention and have no limitative value whatever. For instance the needle of the galvanometer might be replaced by the movable index of a measurement apparatus or of any detecting apparatus, of an electrical, thermic, manometric or other type.

The variation of the sensitiveness of the measurement apparatus might be obtained through a non-electrical device, for instance by the throttling of a conduit through which a fluid is flowing, by a hydraulic or mechanical braking action upon a transmission member, by the interposition of displacement reducing systems (levers, gears, etc.), such a device being inserted in the connection between the means responsive to variations of the factor to be controlled and the measurement apparatus.

The invention is applicable to existing measurement and control apparatus, and in particular to so-called "dropping stirrup" apparatus.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An automatic relay control system which comprises, in combination, a relay including a winding and an armature, a measurement instrument, a movable control member operative by said instrument, a fixed electric contact adapted to cooperate with said membe. for a predetermined position thereof, an electric circuit including a source of current, said movable control member, said contact, and said winding, whereby the cooperation of said member with said contact closes said circuit the source of current of which energizes said winding, shunt means operative by said armature for directly connecting said winding with said source of current as soon as said armature has started moving and then breaking said first mentioned circuit, a contact in said shunt means, means for intermittently opening said last mentioned contact so as to de-energize said relay periodically, and means operative by said measurement instrument for varying the sensitiveness thereof for each operation in response to the measurement made during the preceding operation.

2. An automatic relay control system according to claim 1 further including means adapted to act upon the last mentioned means of claim 1 for bringing back the sensitiveness of the measurement instrument to its initial value after a predetermined number of successive makes and breaks of the shunt means through the operation of the second mentioned contact.

RAYMOND LOUIS ANDRÉ VALTAT.